(12) United States Patent
Ibuka et al.

(10) Patent No.: US 8,609,295 B2
(45) Date of Patent: Dec. 17, 2013

(54) SOLID-ELECTROLYTE FUEL CELL AND STACK STRUCTURE

(75) Inventors: Shigeo Ibuka, Ebina (JP); Keiko Kushibiki, Fujisawa (JP); Yasushi Nakajima, Kawasaki (JP); Saburo Suzuki, Kyoto (JP); Tatsuya Suzuki, Kyoto (JP); Katsunori Matsui, Kyoto (JP); Koji Nakatani, Kyoto (JP)

(73) Assignees: Nissan Motor Co., Ltd., Yokohama-shi (JP); Saijo INX Co., Ltd., Kyoto-shi (JP)

( * ) Notice: Subject to any disclaimer, the term of this patent is extended or adjusted under 35 U.S.C. 154(b) by 1245 days.

(21) Appl. No.: 11/665,863

(22) PCT Filed: Oct. 21, 2005

(86) PCT No.: PCT/JP2005/019839
§ 371 (c)(1),
(2), (4) Date: Apr. 20, 2007

(87) PCT Pub. No.: WO2006/043729
PCT Pub. Date: Apr. 27, 2006

(65) Prior Publication Data
US 2008/0206614 A1    Aug. 28, 2008

(30) Foreign Application Priority Data

Oct. 22, 2004  (JP) ................................ 2004-307771
Aug. 29, 2005  (JP) ................................ 2005-247561

(51) Int. Cl.
*H01M 8/10* (2006.01)
*H01M 8/24* (2006.01)

(52) U.S. Cl.
USPC ........................... 429/465; 429/467; 429/479

(58) Field of Classification Search
USPC ........................................................ 429/34, 35
See application file for complete search history.

(56) References Cited

U.S. PATENT DOCUMENTS 3,365,334 A * 1/1968 Thellmann ...................... 429/26
3,526,549 A    9/1970 Archer et al.
(Continued)

FOREIGN PATENT DOCUMENTS

DE    102 38 860 A1    3/2004
EP    1 006 601 A2     6/2000
(Continued)

OTHER PUBLICATIONS

Shigeo Ibuka et al., USPTO Office Action, U.S. Appl. No. 11/722,133, Jan. 13, 2011, 12 pages.
(Continued)

*Primary Examiner* — Barbara Gilliam
*Assistant Examiner* — Adam A Arciero
(74) *Attorney, Agent, or Firm* — Foley & Lardner LLP

(57) ABSTRACT

For an enhanced rigidity and suppressed occurrences of stress concentration, a solid-electrolyte fuel cell is configured with simplex cells, a metallic separator of a circular thin-sheet form having a gas introducing port and gas discharging ports in the central portion, and cell mounting parts for the simplex cells to be fixed thereto, another metallic separator of a circular thin-sheet form having a gas introducing port and gas discharging ports in the central portion, the separators defining a space in between, and a pair of flow channel members accommodated in the space and pressed to be brought into abutment, for communication of their channels with the gas introducing ports and the gas discharging ports to effect gas supply and gas discharge to and from the space, either flow channel member being joined, within the space, to one separator.

11 Claims, 10 Drawing Sheets

(56) References Cited

U.S. PATENT DOCUMENTS

| | | | |
|---|---|---|---|
| 5,378,247 A | 1/1995 | Sasaki et al. | |
| 5,514,487 A * | 5/1996 | Washington et al. | 429/39 |
| 5,906,898 A * | 5/1999 | Pondo | 429/34 |
| 6,245,453 B1 * | 6/2001 | Iwase et al. | 429/34 |
| 6,344,290 B1 * | 2/2002 | Bossel | 429/456 |
| 6,444,338 B1 | 9/2002 | Araki et al. | |
| 6,649,296 B1 * | 11/2003 | Minh | 429/34 |
| 7,045,243 B2 * | 5/2006 | Kushibiki et al. | 429/34 |
| 7,049,019 B2 | 5/2006 | Tsunoda | |
| 7,086,246 B2 | 8/2006 | Yoshii et al. | |
| 7,122,267 B2 * | 10/2006 | Tsunoda | 429/34 |
| 7,556,873 B2 | 7/2009 | Higashi | |
| 2001/0018141 A1 | 8/2001 | Kobayashi | |
| 2002/0022204 A1 | 2/2002 | Nagano et al. | |
| 2003/0031905 A1 | 2/2003 | Saito et al. | |
| 2003/0077500 A1 * | 4/2003 | Gorbell | 429/35 |
| 2003/0082423 A1 | 5/2003 | Kushibiki et al. | |
| 2004/0018401 A1 | 1/2004 | Fly et al. | |
| 2004/0028986 A1 | 2/2004 | Tsunoda | |
| 2004/0086766 A1 * | 5/2004 | Hartnack et al. | 429/35 |
| 2004/0086769 A1 * | 5/2004 | Diez | 429/38 |
| 2005/0069741 A1 | 3/2005 | Enokizu et al. | |
| 2006/0024534 A1 * | 2/2006 | Nakajima et al. | 429/12 |
| 2007/0218341 A1 * | 9/2007 | Kushibiki et al. | 429/38 |
| 2008/0014488 A1 | 1/2008 | Kushibiki et al. | |
| 2009/0092866 A1 * | 4/2009 | Ibuka et al. | 429/13 |
| 2009/0233141 A1 * | 9/2009 | Kushibiki et al. | 429/32 |
| 2010/0015503 A1 * | 1/2010 | Yaguchi et al. | 429/34 |

FOREIGN PATENT DOCUMENTS

| | | | |
|---|---|---|---|
| EP | 1 261 059 A2 | 11/2002 | |
| EP | 1 369 944 A2 | 12/2003 | |
| JP | 11-153496 A | 6/1999 | |
| JP | 11-162492 A | 6/1999 | |
| JP | 2000-173638 A | 6/2000 | |
| JP | 2001-235111 A | 8/2001 | |
| JP | 2002-008681 A | 1/2002 | |
| JP | 2002-61805 A | 2/2002 | |
| JP | 2002-151106 A | 5/2002 | |
| JP | 2003-132933 A | 5/2003 | |
| JP | 2004-119298 A | 4/2004 | |
| JP | 2004-146343 A | 5/2004 | |
| JP | 2004-146345 A | 5/2004 | |
| JP | 2004-207067 A | 7/2004 | |
| JP | 2004-259615 A | 9/2004 | |
| JP | 2004-288387 A | 10/2004 | |
| JP | 2004-288509 A | 10/2004 | |
| JP | 2004-303462 A | 10/2004 | |
| JP | 2004-335164 A | 11/2004 | |
| JP | 2004-335166 A | 11/2004 | |
| JP | 2005 50691 A | 2/2005 | |
| WO | WO 2004/004038 A2 | 1/2004 | |
| WO | WO 2004/004039 A1 | 1/2004 | |
| WO | WO 2004/012282 A2 | 2/2004 | |
| WO | WO 2004/021492 A1 | 3/2004 | |
| WO | WO 2004/059771 A2 | 7/2004 | |
| WO | WO 2004059771 A2 * | 7/2004 | |
| WO | WO 2004/088334 A1 | 10/2004 | |
| WO | WO 2005/109557 A1 | 11/2004 | |
| WO | WO 2005/122314 A2 | 12/2005 | |

OTHER PUBLICATIONS

Keiko Kushibiki et al., USPTO Office Action, U.S. Appl. No. 11/628,721, Jul. 6, 2010, 41 pages.

Shigeo Ibuka et al. USPTO Notice of Allowance, U.S. Appl. No. 11/722,133, Jun. 22, 2011, 11 pages.

* cited by examiner

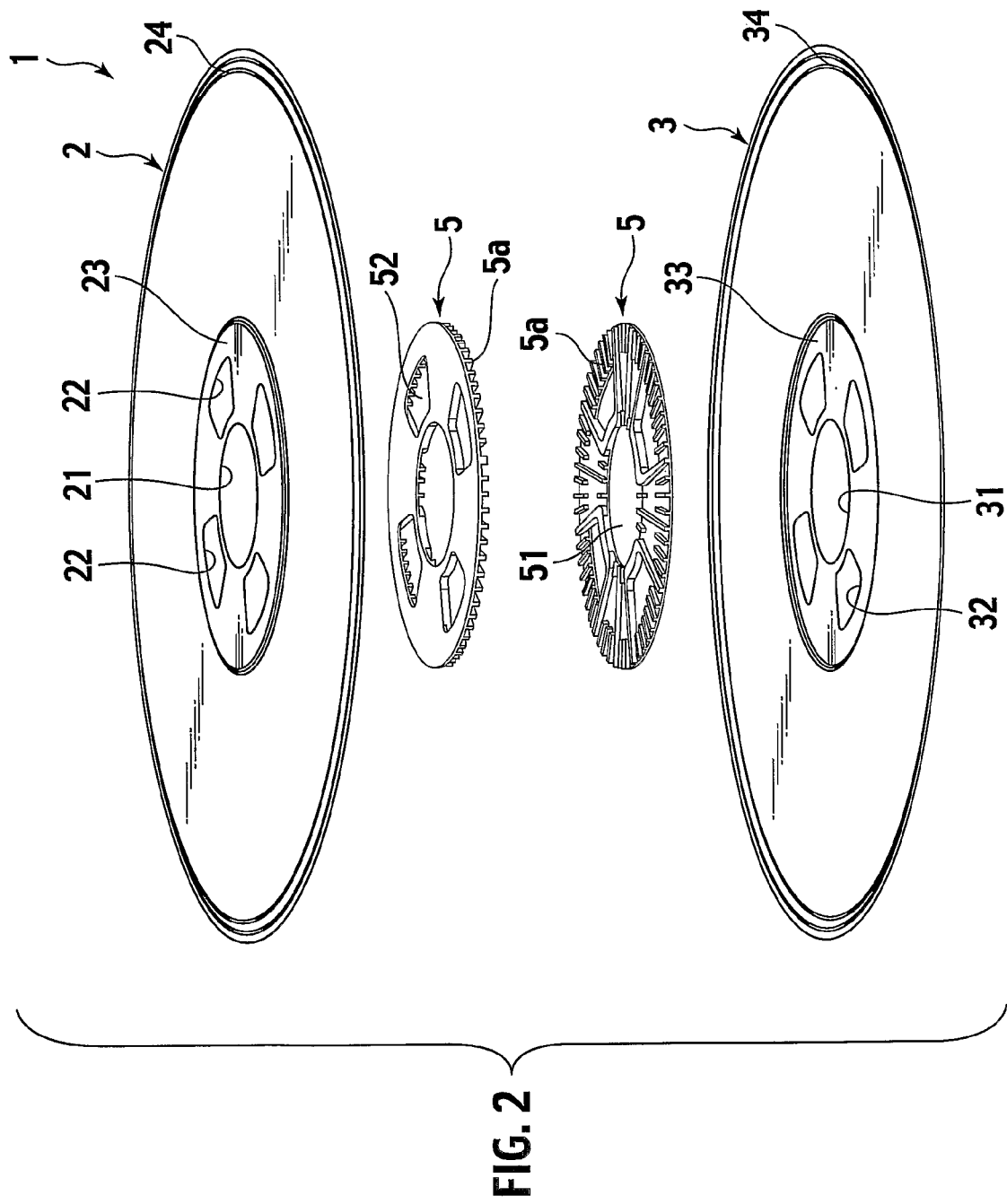

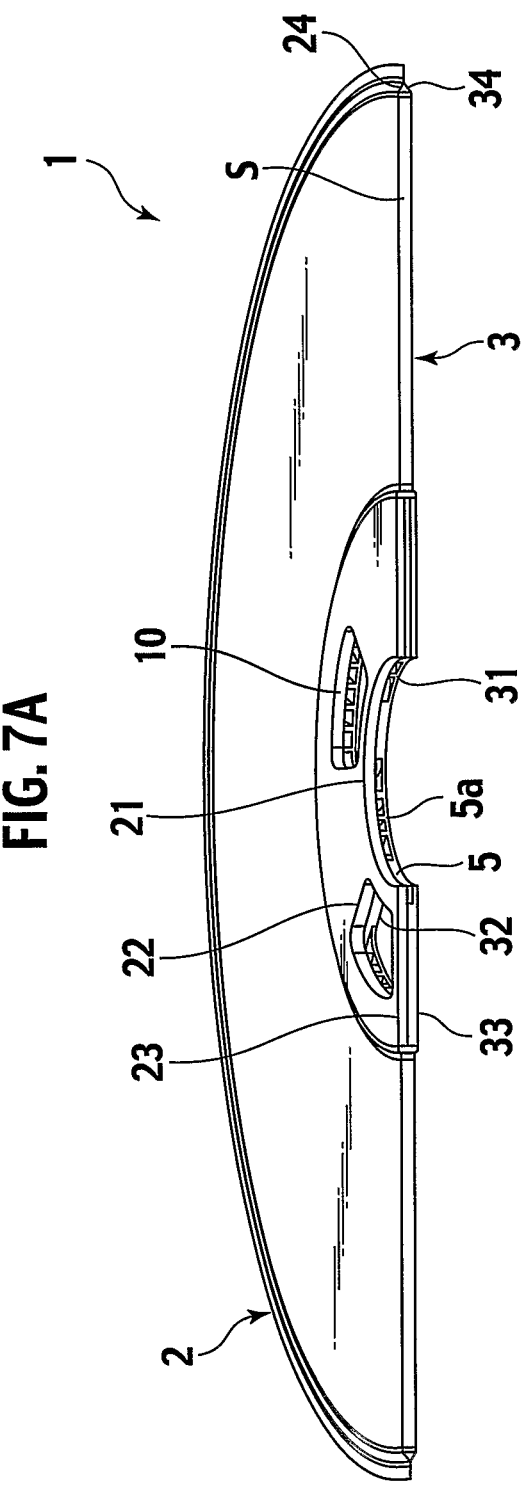
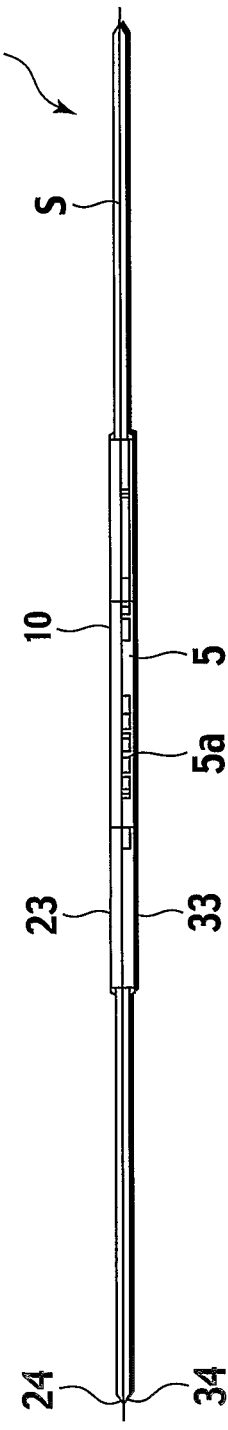

SOLID-ELECTROLYTE FUEL CELL AND STACK STRUCTURE

TECHNICAL FIELD

The present invention relates to a solid-electrolyte fuel cell of the type to be laminated for use, and a stack structure composed of laminated solid-electrolyte fuel cells.

BACKGROUND ART

Such a type of solid-electrolyte fuel cell disclosed in U.S. Pat. No. 6,344,290B1 is configured as a lamination of a cell plate and separators pressed in a stepped form, having their joints partially open, to be cooperative with vortex channels defined by the pressed separators, for smooth gas flows along the cell plate.

In Japanese Patent Application Laying-Open Publication No. 2002-151106, a solid-electrolyte fuel cell is configured with a cell plate and separators pressed in a stepped form, having their outer peripheral edge portions joined together, defining a pouch portion in between, and accommodating dimpled collectors as rectifiers inside and outside the pouch portion, for gas flows to go up from below. The pressed separators have double-staged steps, allowing for a spacer-less lamination.

In Japanese Patent Application Laying-Open Publication No. 2002-8681, a solid-electrolyte fuel cell is configured with a pair of cell plates shaped in a disc-form and joined together at their outer peripheral edge portions, for a vertical gas diffusion.

DISCLOSURE OF THE INVENTION

A solid-electrolyte fuel cell configured with separators formed with vortex channels needs spacers for lamination, resulting in an increased number of components and concerns for gas leakage at joints to the spacers, and the use of springs for pressing an entirety to be fixed with stresses unable to be released.

A solid-electrolyte fuel cell configured with cell plate and separators joined together to define a pouch portion in between is complicated in structure, and tends to have concentrated stresses due to differences in thermal expansion between cell plate and separators, with concerns for gas leakage.

A solid-electrolyte fuel cell configured with paired cell plates shaped in a disc-form undergoes an uneasy fabrication due to the structure, and has an increased number of ceramic components, resulting in an increased weight and a reduced rigidity.

The present invention is achieved with such points in view, and has an object to provide a solid-electrolyte fuel cell and a stack structure, allowing for an expanded freedom in joining method or process, permitting an enhanced yield of the process, and additionally enabling concerns for gas leakage to be almost cast away.

For application to a vehicle in which starting and stopping are frequently repeated, the stack structure of solid-electrolyte fuel cells should have an increased resistance to thermal shocks.

For a reduction of volume, weight and/or heat capacity as a great problem to be solved, it is considered to introduce a solid-electrolyte fuel cell using metallic separators.

To achieve the object, according to an aspect of the invention, a solid-electrolyte fuel cell comprises a simplex cell, a metallic first separator of a circular thin-sheet form having a gas introducing port and a gas discharging port in a central portion thereof, and a cell mounting part for the simplex cell to be fixed thereto, a metallic second separator of a circular thin-sheet form having a gas introducing port and a gas discharging port in a central portion thereof, a space defined between the first and second separators, and a flow channel member accommodated in the space, and configured for communication with the gas introducing ports and the gas discharging ports to effect gas supply and gas discharge to and from the space, the flow channel member being joined, within the space, to at least one of the first and second separators.

According to another aspect of the invention, a stack structure comprises a lamination of solid-electrolyte fuel cells according to the above-noted aspect.

The above and further features, functions, and advantages of the invention will be fully appear in the following combination of a best mode for carrying out the invention and examples thereof, when the same is read in conjunction with the accompanying drawings.

BRIEF DESCRIPTION OF DRAWINGS

FIG. 2 is an exploded view of the solid-electrolyte fuel cell of FIG. 1A.

FIG. 7A is a perspective view of a half-cut of a solid-electrolyte fuel cell according to another example of the mode of embodiment of the invention.

FIG. 7B is a half-cut sectional view of the solid-electrolyte fuel cell of FIG. 7A.

BEST MODE FOR CARRYING OUT THE INVENTION

There will be described a mode of embodiment as the best mode for carrying out the invention, as well as examples and modifications thereof, with references made to the drawings.

Figure 1A:
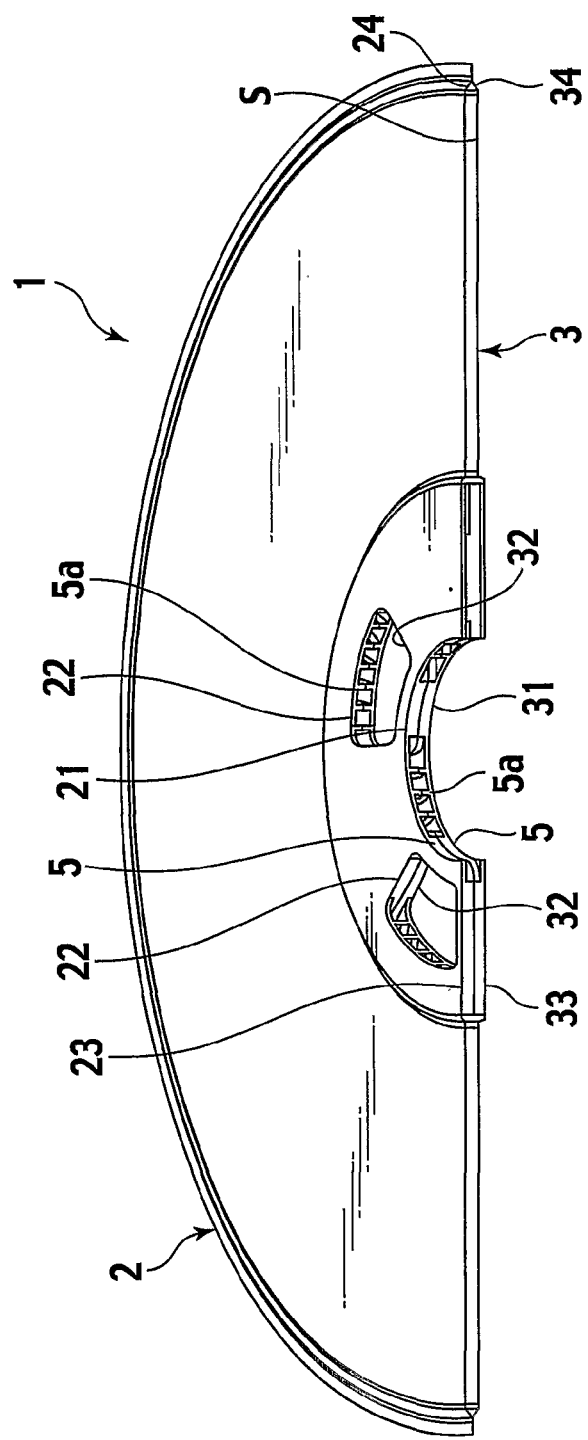
FIG. 1A is a perspective view of a half-cut of a solid-electrolyte fuel cell according to an example of a mode of embodiment of the invention.
Figure 1B:
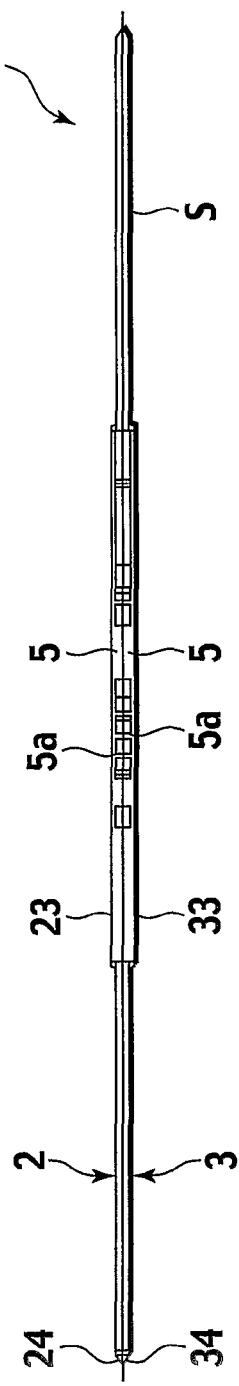
FIG. 1B is a half-cut sectional view of the solid-electrolyte fuel cell of FIG. 1A.
Figure 8A:
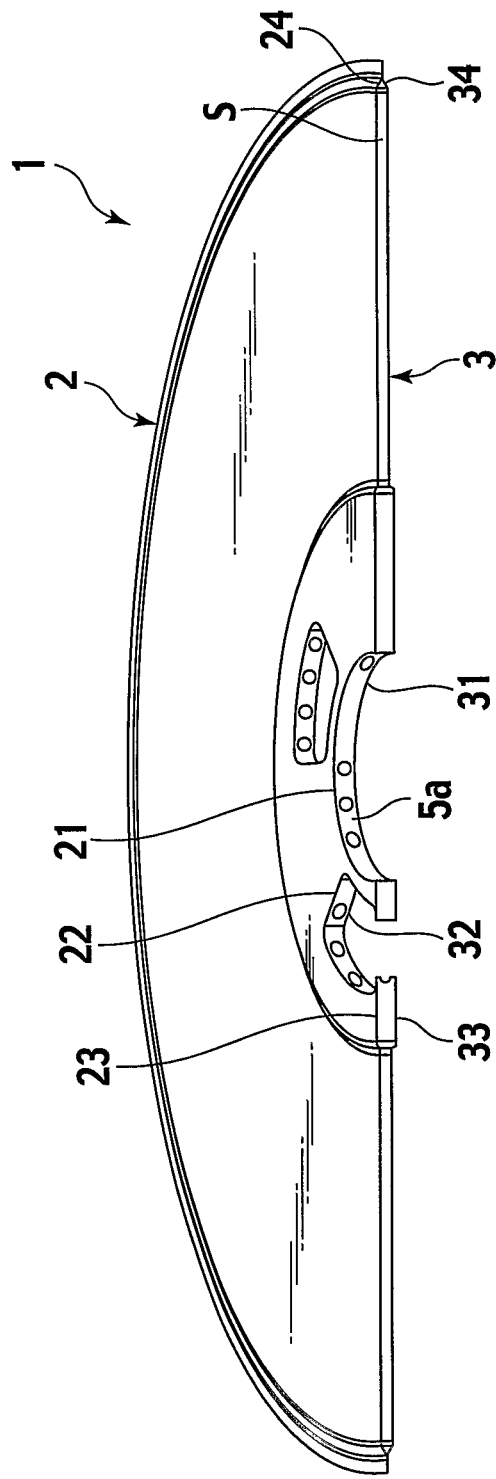
FIG. 8A is a perspective view of a half-cut of a solid-electrolyte fuel cell according to another example of the mode of embodiment of the invention.
Figure 8B:
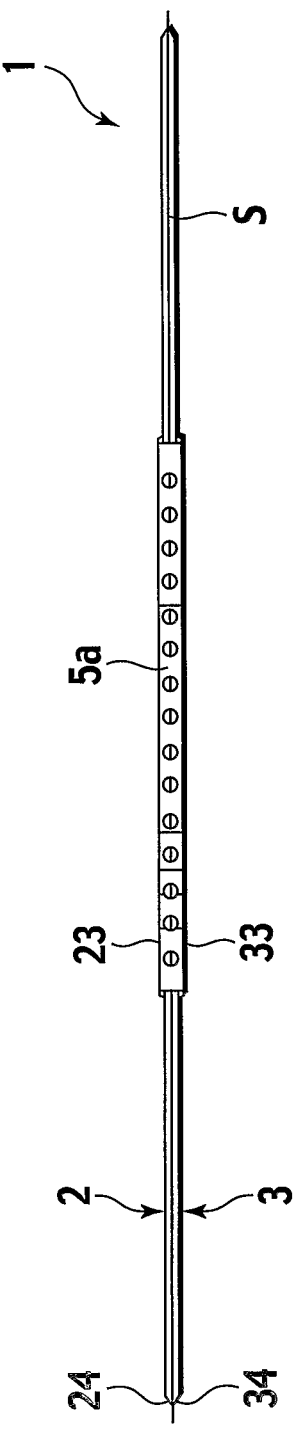
FIG. 8B is a half-cut sectional view of the solid-electrolyte fuel cell of FIG. 8A.
Figure 11A:
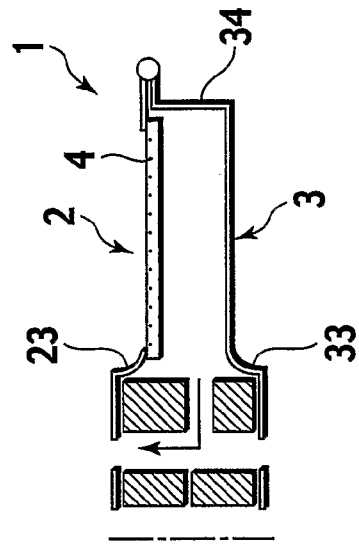
FIGS. 11A to 11E are sectional views of solid-electrolyte fuel cells having various separators according to modifications of the example of embodiment, respectively.
Figure 11B:
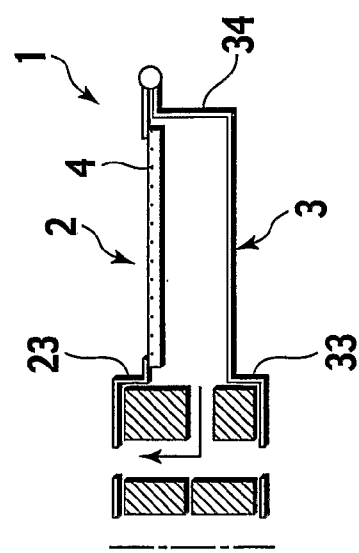
Figure 11C:
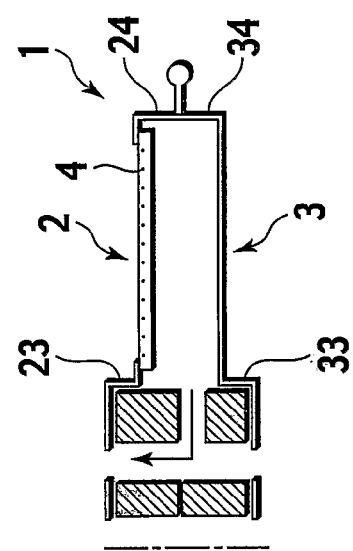
Figure 11D:
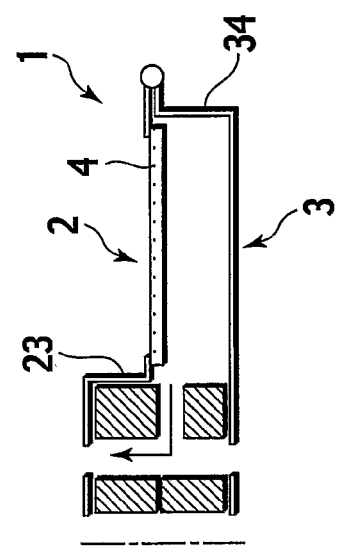
Figure 11E:
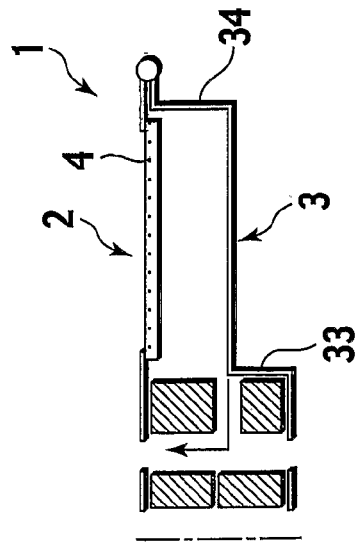
Figure 12A:
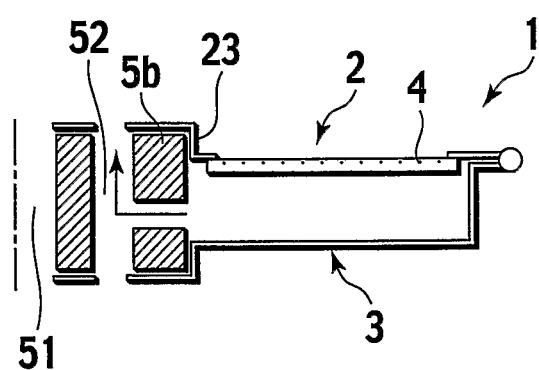
FIGS. 12A and 12B are sectional views of solid-electrolyte fuel cells having integrated flow channel members according to modifications of the example of embodiment, respectively.
Figure 12B:
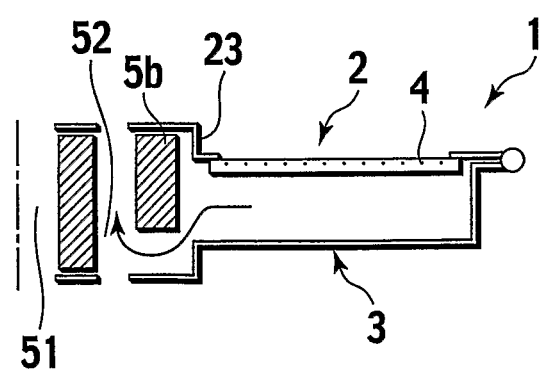

In the description, FIGS. 1A and 1B, 7A and 7B, 8A and 8B, 11A to 11E, and 12A and 12B are sometimes collectively referred to as "FIG. 1", "FIG. 7", "FIG. 8", "FIG. 11", and "FIG. 12", respectively.

Figure 3:
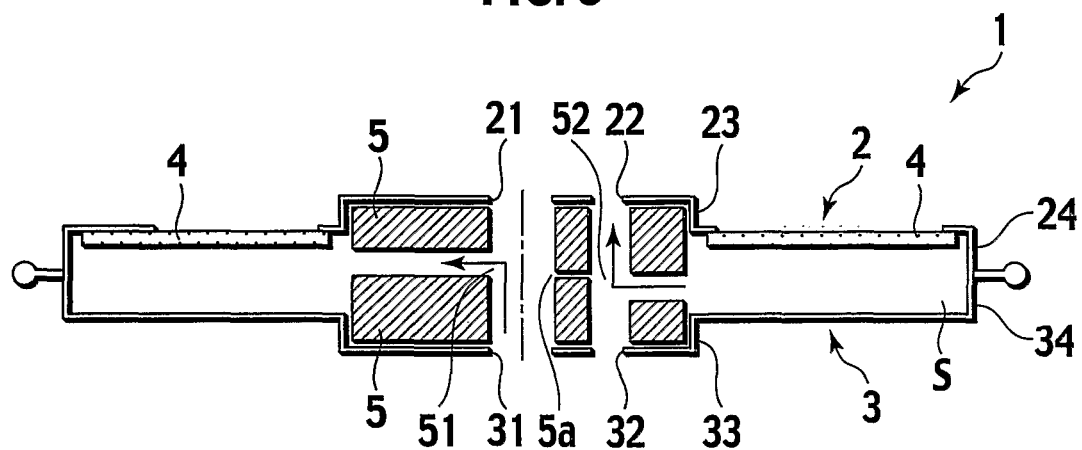
FIG. 3 is a sectional view of the solid-electrolyte fuel cell of FIG. 1A.
Figure 4:
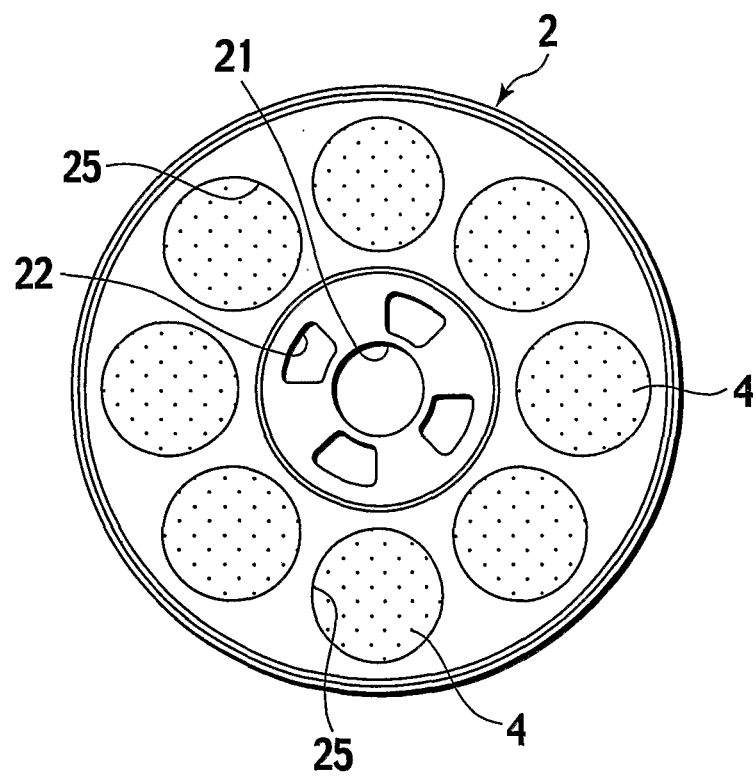
FIG. 4 is an internal plan view of the solid-electrolyte fuel cell of FIG. 1A, illustrating a layout pattern of simplex cells.
Figure 5:
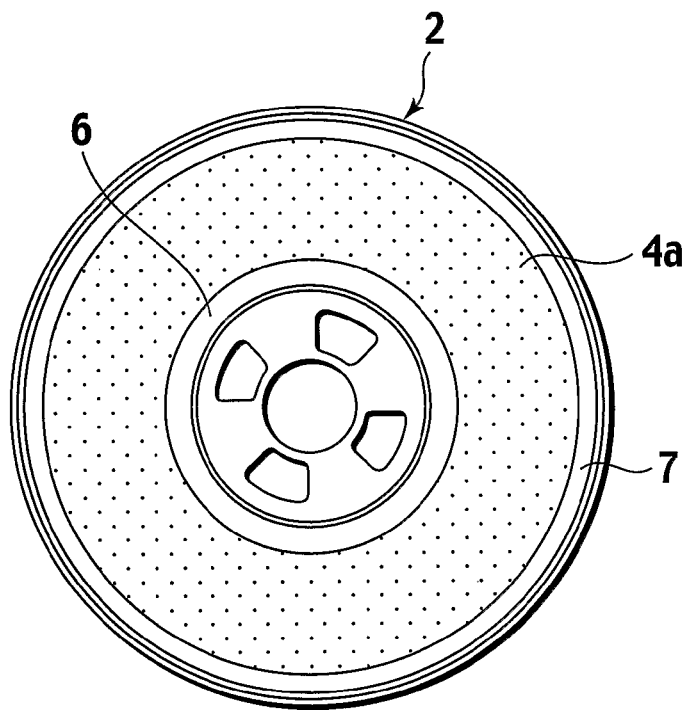
FIG. 5 is an internal plan view of a solid-electrolyte fuel cell according to a modification of the example of embodiment, illustrating another simplex cell layout pattern.
Figure 6:
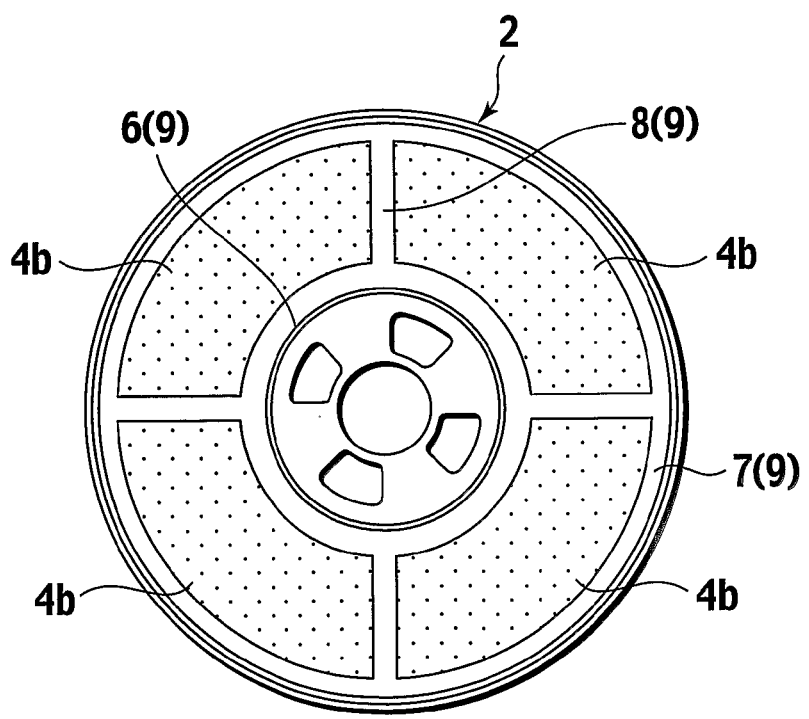
FIG. 6 is an internal plan view of a solid-electrolyte fuel cell according to a modification of the example of embodiment, illustrating another simplex cell layout pattern.

According to the mode of embodiment, as illustrated in the figures, a solid-electrolyte fuel cell (1 [FIGS. 1-3, 7-12]) is configured with one or more simplex cells (4 [FIGS. 1-4, 10-12], 4a [FIG. 5], 4b [FIG. 6]. A metallic separator (2 [FIGS. 1-12]) of a circular thin-sheet form, having at least one gas introducing port (21 [FIGS. 1-4, 7-8]) and one or more gas discharging ports (22 [FIGS. 1-4, 7-8]) in a central portion thereof, and one or more cell mounting parts (25 [FIG. 4], 6 [FIG. 5-6], 7 [FIG. 5-6], 8 [FIG. 6], 9 [FIG. 6]) for the one or more simplex cells (4, 4a, 4b) to be fixed thereto. The fuel cell can further include another metallic separator (3 [FIGS. 1-3, 7-8, 10-12]) of a circular thin-sheet form having at least one gas introducing port (31 [FIGS. 1-3, 7-8]) and one or more gas discharging ports (32 [FIGS. 1-3, 7-8]) in a central portion thereof. The separators (2, 3) can define a space (S [FIGS. 1, 3, 7-8]) in between and a flow channel member (5 [FIGS. 1-3, 7-8, 10], 5a [FIGS. 1-3, 7-8], 5b [FIG. 12]) (divided and assembled, rebuilt or joined, or integrated, and) accommodated in the space (S) (together with one or more spacers 10 [FIG. 7], if necessary), for fluid communication of their channels (51 [FIGS. 2-3, 12], 52 [FIGS. 2-3, 12]) with the gas introducing ports (21, 31) and the gas discharging ports (22, 32) to effect gas supply and gas discharge to and from the space (S). In addition, the flow channel member (5, 5b) may be joined, within the space (S), to at least one of the separators (2, 3).

In the solid-electrolyte fuel cell (1), the separators (2, 3) may be joined together, in mutually opposing positions, at their outer peripheral edge portions. The outer peripheral edge portions of metallic separators (2, 3) may be wholly joined together to define a space (S) therebetween, allowing for gases to circulate therein. Solid-electrolyte fuel cells (1) formed with such a pouch portion (S) may be laminated to constitute a stack structure (11 [FIGS. 9-10]), which may be mounted in a vehicle, to reduce the possibility of gas leakage against external shocks. For outer peripheral edge portions of separators (2, 3), the joining may be by a diffusion bonding, a welding, a brazing, or an adhesive.

In the solid-electrolyte fuel cell (1), the separators (2, 3) are shaped in a thin-sheet form for a reduction of weight and, with repeated start-and-stops, may experience thermal deformations, accompanying stress concentrations, such as at their joints to one or more simplex cells (4, 4a, 4b) or locations having developed temperature differences, causing a need for the rigidity or strength to be increased, wherefor the metallic separators (2, 3) may preferably be pressed to form step parts (23 [FIGS. 1-3, 7-11], 33 [FIGS. 1-3, 7-11], 24 [FIGS. 1-3, 7-11], 34 [FIGS. 1-3, 7-11]).

The solid-electrolyte fuel cell (1) is configured to define a pouch portion (S) between a pair of separators (2, 3). In this configuration, if the paired separators (2, 3) are different in form, resultant differences in thermal expansion or stress distribution may cause stress concentrations. The pair of separators (2, 3) may preferably be shaped in an identical form.

In the solid-electrolyte fuel cell (1), each separator (2, 3) can be pressed to form step parts (23, 33, 24, 34). The separator (2, 3) has a greater rigidity, as the number of step parts (23, 33, 24, 34) increases. For example, at least one of the separators (2, 3) may be stepped in the central portion and in an outer peripheral edge portion thereof. A step part (23, 33) in the central portion may have a circular convex form protruding in an outward direction of the space (S) defined between the separators (2, 3), and a step part (24, 34) in the outer peripheral edge portion may have an annular form protruding in an inward direction of the space (S). The circular convex step part (23, 33) in the central portion may be formed with the gas introducing port (21, 31) and gas discharging ports (22, 32).

The circular convex step part (23, 33) in the central portion of the separator (2, 3) may have a spacing function to serve, and may be used, as a spacer between the paired separators (2, 3). The annular step part (24, 34) in the outer peripheral edge portion of the separator (2, 3) may have a function of, and may be used for, defining a space (S) of a pouch form between the paired separators (2, 3).

The annular step part (24, 34) in the outer peripheral edge portion of separator (2, 3) has a step height, which constitutes an undue resistance to gas flow into the space (S), if it is too small, or reduces the packing density, if it is too large. This step height may preferably be set within a range of 0.1 mm to 5 mm, whereas the step height has an influence on the workability in pressing, as well, and may preferably be set 2 mm or less for a SUS430 separator 0.1 mm thick. For the circular convex step part (23, 33) in the central portion of separator (2, 3), of which height has an influence on the workability in pressing, too, this step height also may preferably be set 2 mm or less for a SUS430 separator 0.1 mm thick.

The annular step part (24, 34) is formed in an outer peripheral edge portion of at least one of two separators (2, 3). Annular step parts (24, 34) may thus be formed on the two separators (2, 3) in a symmetric form, allowing for an increased suppression of stress concentration. These step parts (24, 34) may then be changed in step height between the separators (2, 3), still allowing an expectation for an increased rigidity due to the provision of a step. One separator (2) may preferably be formed with a step (24) to have an increased area for mounting one or more simplex cells (4, 4a, 4b). The shape of separator (2, 3) can thus be modified in accordance with characteristic(s) to be emphasized, such as an enhanced resistance to thermal shock or enhanced output energy density.

The circular convex step parts (23, 33) in central portions of separators (2, 3) serve to prevent occurrences of short-circuit between laminated solid-electrolyte fuel cells (1), and for secured communication of air at the cathode side. For lamination of solid-electrolyte fuel cells (1), an insulating or sealing ceramic adhesive may be used to effect an insulation between the cells (1) or for an enhanced packing density. For the laminated solid-electrolyte fuel cells (1) to be pressed with a load, the circular convex step parts (23, 33) in central portions of separators (2, 3) are coated with a good insulating material (e.g. alumina, zirconia) sprayed or spattered thereon, and loaded, with a metal gasket or the like inserted in between. The load may be imposed, with springs inserted between them, for the sealing to be secured upon thermal expansion.

The circular convex step parts (23, 33) in central portions of separators (2, 3) may preferably be each formed with a flat joint face, to be joined with a circular convex step part (33, 23) of a neighboring one of solid-electrolyte fuel cells (1) to be laminated. Such joint faces of mating step parts (23, 33) may have a couple of polarity identifiers (e.g. convex and concave) or geometrical mating marks for a positioning in the lamination.

The neighboring solid-electrolyte fuel cells (1) have their separators (2, 3) provided with circular convex step parts (23, 33) in central portions thereof, and brought into abutment at the step parts (23, 33), to be joined together, without the need of a spacer, allowing for the joining to be free of gas leakage, with a resultant decrease in number of components of the stack structure (11).

In the solid-electrolyte fuel cell (1), at least one separator (2) may have, in the central portion, a step part (23) stepped like a plateau or terrace and formed with at least one gas introducing port (21) and one or more gas discharging ports (22). This step part (23) may protrude in an outward direction of the space (S) defined between separators (2, 3), for a configuration to fit on, or to accommodate therein, the flow channel member (5, 5b).

Solid-electrolyte fuel cells (1) of such a configuration may be laminated and pressed with an adequate load imposed on the central portion, allowing for their joints to be free of gas leakage, even if the sealing were insufficient between the flow channel member (5, 5b) and separators (2, 3). Moreover, a lack of external firing of fuel enables the fuel consumption to be improved, allowing for wide application to a recirculating system.

The flow channel member (5, 5b) may be joined to one or both of separators (2, 3). The flow channel member (5, 5b) may have supply and return channels defined by partition walls (5a (FIGS. 1-3, 7-8)) thereof, of which corresponding ones (5a) may preferably be joined together or separated in opposite positions to be arranged for mutual abutment therebetween. In the case of separate partition walls (5a), they may preferably be processed flush at both sides, for sufficient contact to be achieved therebetween simply by pressing forces of the entire stack structure (11).

The separators (2, 3) may have a flow channel member (5b) joined to one (2) of them and a spacer (10) or flat plate joined to the other (3), with a resultant reduction of flow path area, without functional defects.

The solid-electrolyte fuel cell (1) is configured for introduction of fuel gas to the pouch portion (S), but may well be configured for introduction of air to the pouch portion (S), having fuel gas flow outside thereof. The gas flow inside the pouch portion (S) may be controlled by additional steps pressed on separator(s), or density distribution of incorporated collectors.

In the solid-electrolyte fuel cell (1), the flow channel member (5) may be divided into two or more pieces (5) to be brought into contact for their integration to be complete with loads imposed on separators (2, 3) in mutually approaching directions of the separators (2, 3). As the flow channel member (5) is divided into two or more pieces (5), they may be joined to either separator (2, 3) to have sufficient strengths or rigidities for adequate loads on the central portions to permit employment of a spot welding for joints between either separator (21, 3) and divided piece(s) (5) and/or between divided pieces (5), without functional defects.

In the solid-electrolyte fuel cell (1), the flow channel member (5) may be joined to thee separator(s) (2, 3) by a diffusion bonding, a welding, a brazing, or an adhesive.

In the solid-electrolyte fuel cell (1), upon thermal shocks, welded parts might have stress concentrations with potential occurrences of weld defects, which however would be kept from causing a gas leak, by the configuration having the flow channel member (5) joined within the space (S) to at least one separator (2, 3).

Simplex cell(s) (4, 4a, 4b) may be joined for fixation to the cell mounting part(s) of the separator (2), by a brazing or an adhesive. For the brazing, the surface of electrolyte of simplex cell (4, 4a, 4b) may preferably be metalized with Ti, before Ag brazing. The metalization may be a coating or spattering of a brazing paste. For an adhesive bonding, such a metalization may be followed by a bonding with a ceramic or glass adhesive between metallic surfaces, under a load for a required air-tightness. For the separators (2, 3) to be joined together at the outer peripheral edge portions, a laser welding or arc welding may be employed, as well as a brazing or an adhesive.

In the solid-electrolyte fuel cell (1), an annular region between the central portion and the outer peripheral edge portion of the separator (2) may be configured as a cell mounting part (25) for mounting thereon one or more simplex cells (4, 4a, 4b). Small-diameter circular simplex cells (4) may be arranged in a co-centric and axisymmetric layout about a gas introducing port (21) in the central portion of separator (2). An annular simplex cell (4a) may have its inner and peripheral edge parts joined to pressed inner and outer rings (6, 7 [FIGS. 5-6]), which may be additionally connected by radial pieces (8 [FIG. 6]) to provide a frame (9 [FIG. 6]) for sectorial simplex cells (4b) to be stacked thereto for a facilitated joining.

For simplex cells (4, 4b) to be fixed, a pressed step may be provided between neighboring cells (4, 4b) to have an increased rigidity. For a thick simplex cell (4a), a recess may be pressed for cancellation of the thickness. The separators (2, 3) may be identical in form except for the cell mounting part(s) that may have a various suitable form.

The provision of cell mounting part(s) in the annular region between central portion and outer peripheral edge portion of the separator (2) allows for an enhanced freedom in selection of simplex cell configuration. The outer peripheral edge parts, which have stresses acting thereon, may be metal-metal joined for an increased rigidity of solid-electrolyte fuel cell (1).

The separators (2, 3) may be made of Fe—Cr system alloys such as SUS430, SUS316L, ZMQ, FeCrSi, and FeCrW. Ni—Cr system alloys of inconel 750 and the inconel 718, and the like may be adopted, with care to avoid a mismatch of coefficient of thermal expansion. In the solid-electrolyte fuel cell (1), the separators (2, 3) of a thin-plate form may be made of an alloy of which principal component is Fe or Ni, and the step parts are pressed. A long-term durability of stack structure may be secured by use of such a high-heat-resistant alloy material.

It is preferable to assume the wall thickness of the separator to do laminated to be 0.05-0.5 mm in lightening it again. A strength of the separator decreases when the wall thickness of the separator is too thin, and durability to the hydrogen embrittlement worsens, too. On the other hand, thermal capacity is increased when the wall thickness of the separator is too large, and there is a considerable problem with a deterioration of the processing, an increase in weight, and the packing density etc. The best board thickness depends on the material, and it is thought that about 0.1 mm for SUS430.

When solid-electrolyte fuel cells (1) with simplex cells of low operating temperature are accumulated in a stack structure, the freedom in selection of metallic material and the sealant is high. An organic adhesive may be used for joining simplex cell or and the solid oxide fuel cell mutually, and it becomes extremely easy to assemble.

Providing a strong structure to the thermal shock at the start/stop by using the alloy material, which has heat resistance in the separator, it becomes possible to use the alloy material which has heat resistance for the separator at a high temperature operation of 500° C. or more when the solid oxide fuel cells are utilized and the stack structure is formed.

EXAMPLES

There will be described various examples of the mode of embodiment, with reference to the drawings. Like members or elements are designated by like reference characters. It is noted that the examples are given for illustrative purposes, and not restrictive.

FIGS. 1A, 1B, 2, and 3 illustrate a solid-electrolyte fuel cell 1 as an example of the best mode of embodiment. The solid-electrolyte fuel cell 1 is configured, as in FIGS. 1A and 1B showing half-cut views, with a pair of metallic separators 2 and 3, of which one 2 (upper separator in the figures) is shaped in a circular thin-plate form, and has in a central circular portion thereof a gas introducing port 21 and gas discharging ports 22; and the other 3 (lower separator in the figures) is shaped in a circular thin-plate form, like the separator 2, and has in a central circular portion thereof a gas introducing port 31 and gas discharging ports 32. The separators 2 and 3 are joined together, in mutually opposing positions, at their outer peripheral edge portions, having a bag or pouch portion (as a space for accommodation) S defined between them, in which unshown electric collectors are accommodated.

The separators 2 and 3, joined together in the mutually opposing positions, have: in the central portions, (upper and lower, in the figures) stepped circular convex parts (hereafter called "circular convex step parts") 23 and 33 pressed in a form to be concentric with outer peripheral edge portions, respectively, and protruding in mutually spacing directions (i.e. outward directions of the pouch portion S, or upward and downward directions in FIG. 3, respectively); and in the outer peripheral edge portions, (upper and lower, in the figures) stepped annular parts (hereafter called "annular step parts") 24 and 34 pressed in a form to be concentric with the outer peripheral edge portions, respectively, and protruding in mutually approaching directions (i.e. inward directions of the pouch portion S, or downward and upward directions in FIG. 3, respectively). The gas introducing ports 21 and 31 and gas discharging ports 22 and 32 are formed in the circular convex step parts 23 and 33, respectively.

The separator 2 has, as in FIG. 4 showing a plan view, cell mounting parts 25 provided in an annular region between the central portion and the outer peripheral edge portion, or, at eight locations about the gas introducing port 21 at the center of separator 2. The cell mounting parts 25 have circular simplex cells 4 fixed thereto. The circular thin-sheet form of the second separator 3 may be identical to the circular thin-sheet form of the first separator 2 except for the cell mounting parts 25.

Of circular convex step parts 23 and 33 in the central portions of separators 2 and 3: the circular convex step part 33 of separator 3 has accommodated therein a flow channel member 5 (i.e. lower channel member 5 in the figures) formed with gas introducing channels 51 communicating with the gas introducing port 31, for supply of gas into the pouch portion S defined between the separators 2 and 3; and the circular convex step part 23 of separator 2 has accommodated therein another flow channel member 5 (i.e. upper channel member 5 in the figures) formed with gas discharging channels 52 communicating with the gas discharging ports 22, for discharge of gas from the pouch portion S, as well shown in FIGS. 2 and 3.

The (lower and upper) flow channel members 5 have supply and return channels defined by (lower and upper) partition walls 5a thereof, which are arranged in opposite positions for mutual abutment therebetween (i.e. for abutment from up and down at their contacting edges), so that when solid-electrolyte fuel cells 1 are laminated in the form of a stack structure, mutually opposing (lower and upper) partition walls 5a (in each cell layer) are brought into tight-contacting abutment, simply by pressing forces (due to a tightening load) of the entire stack, as will be described.

For this example, a SUS430 rolled sheet 0.1 mm thick was employed as a material for separators 2 and 3. The rolled sheet was set to a press tool equipped with a super-hard/SKD11 die, and pressed under an 80-ton press load for a 24-step pressing process to provide separators 2 and 3. The sheet thickness may be within a range of 0.05 mm to 0.5 mm. The separators 2 and 3 after the pressing process had an outside diameter of 125 mm, and circular convex step parts 23 and 33 of a 50-mm diameter, while the circular convex step parts 23 and 33 and annular step parts 24 and 34 had a typical step dimension of 1 mm, and outer peripheral edge portions of the separators 2 and 3 were joined together by a laser welding.

Lower and upper flow channel members 5, employing the SUS430, were joined for fixation to the separators 2 and 3, respectively, by welding, or more specifically, by a diffusion bonding in vacuum at a bonding temperature of 1000° C. or less, for prevention of deformation in the bonding. For this joining, a laser welding by YAG laser may be used in place of the diffusion bonding. The separators 2 and 3, both thin as a sheet, may well be irradiated by laser from the outside to effect the joining. The joining may be effected by a brazing or an adhesive, as circumstances require. The flow channel members 5 have channel patterns, which may be formed by an etching or laser-texturing, or by joining a lamination of etched parts.

The solid-electrolyte fuel cell 1 has a pair of separators 2 and 3 substantially identical in form, allowing for prevention against occurrences of stress concentration due to thermal expansion or thermal deformation. The separators 2 and 3 have their central portions and outer peripheral edge portions provided with circular convex step parts 23 and 33 and annular step parts 24 and 34, respectively, achieving an increased rigidity, allowing for prevention against occurrences of thermal deformation.

In the solid-electrolyte fuel cell 1, (lower and upper) flow channel members 5 are joined at an inner side of the pouch portion S to the circular convex step parts 23 and 33 in the central portions of separators 2 and 3, respectively, needing no concerns for gas leakage, requiring no checks for a complete sealing at the joints, thus allowing for an expanded freedom in choice of the joining method or process, permitting an enhanced yield of the process.

The example of embodiment described has a configuration for a plurality of small-diameter circular simplex cells 4 to be mounted as in FIG. 4. The mode of embodiment, not limited to this case, may be modified, as illustrated in FIG. 5, for an annular or toroidal simplex cell 4a to be mounted or fitted for fixation to a separator 2 provided with pressed inner and outer rings 6 and 7, which are joined to inner and outer peripheral edge portions of the cell 4a, respectively. For workability in joining, this example may be additionally modified, as illustrated in FIG. 6, by provision of radial pieces 8 (i.e. vertical and horizontal cross pieces in the figure) for connection between inner and outer rings 6 and 7 to constitute an integrated frame 9, which may accommodate or fit on a plurality of sector or fan-shaped simplex cells 4b.

The examples of embodiment described are configured for (lower and upper) flow channel members 5 accommodated or fitted in the circular convex step parts 23 and 33 in the central portions of separators 2 and 3, respectively. The mode of embodiment, not limited to those cases, may be modified: as illustrated in FIGS. 7A and 7B, for a spacer 10 substituting for either (upper in this case) flow channel member 5; or as illustrated in FIGS. 7A and 7B or 8A and 8B, for a single or integrated flow channel member 5 identical in thickness (to the described cases) to be accommodated or fitted in either (lower, in FIGS. 7A and 7B) circular convex step part 23 or 33, or substantially double-sized in thickness to be accommodated or fitted in a combination of (lower and upper, in FIGS. 8A and 8B) circular convex step parts 23 and 33. For the spacer 10 substituting for either flow channel member 5, the lamination may need high pressing forces, whereto a metal gasket may be desirable.

Figure 9:
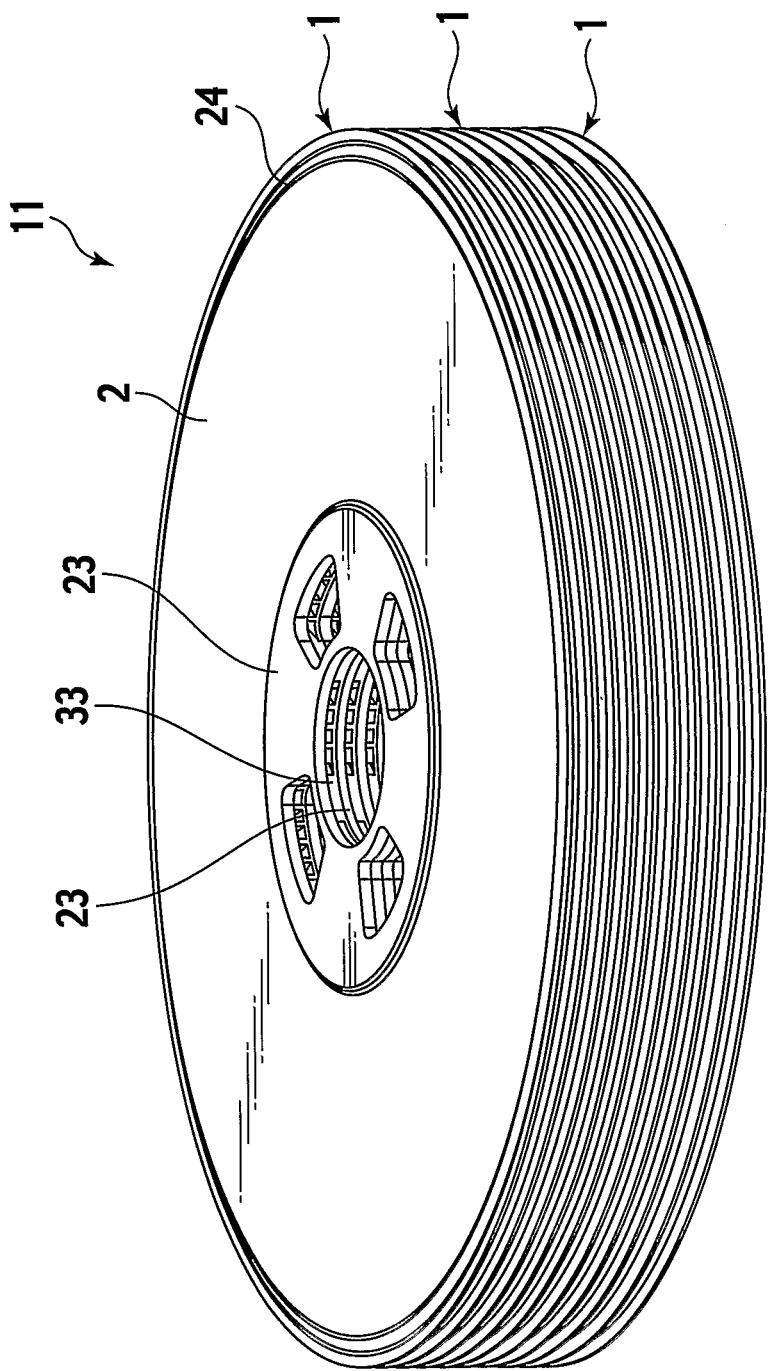
FIG. 9 is a perspective view of a stack structure as a lamination of solid-electrolyte fuel cells according to the example of embodiment.
Figure 10:
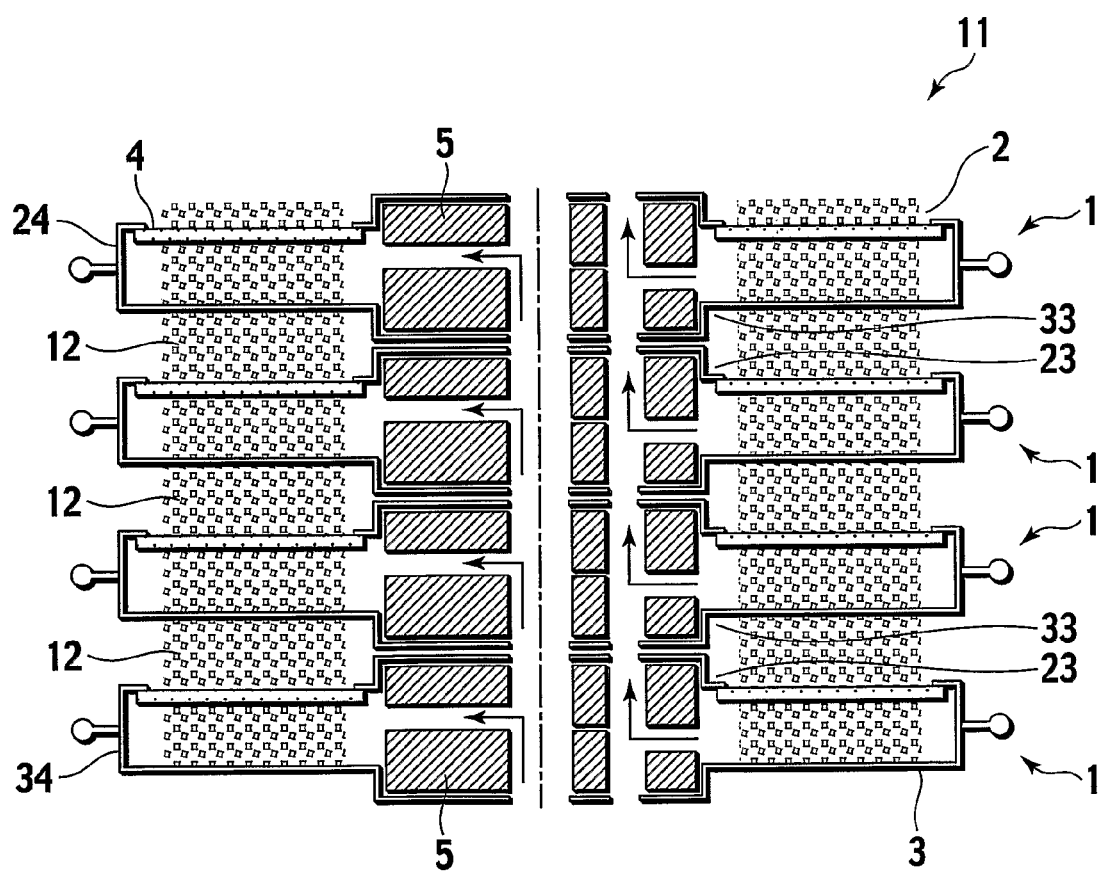
FIG. 10 is a longitudinal sectional view of the stack structure of FIG. 9.

FIGS. 9 and 10 illustrate an appearance and a longitudinal section of a stack structure 11 as a lamination of solid-electrolyte fuel cells 1 that may be modified as described. In the stack structure 11, solid-electrolyte fuel cells 1 are laminated with porous or air-permeable electric collectors 12 inserted therebetween, and neighboring fuel cells 1 have intervening separators 2 and 3 bonded together at their circular convex step parts 23 and 33 by an adhesive agent.

The stack structure 11 can be insulated between every pair of neighboring fuel cells 1 that have intervening separators 2 and 3 bonded to each other at the circular convex step parts 23 and 33, with an increased packing density, allowing for an ensured communication of air channels on the cathode side, as well as for facilitated assembly work.

It also is allowed to provide a spacer-less configuration, and render the joint free of gas leakage, with a reduced number of components.

This example of embodiment is configured for a solid-electrolyte fuel cell 1 with a pair of separators 2 and 3 identical in form. The mode of embodiment, not limited to this case, may have a pair of separators 2 and 3 modified such that: as illustrated in FIG. 11A or 11B, either separator 2 to be provided with a simplex cell 4 is configured simply with a steep-stepped or moderate-stepped circular convex part 23 of a typical height (without annular step part), and the other separator 3 is configured with a circular convex step part 33 of the typical height and an annular step part 34 of a double height of the typical height; as illustrated in FIG. 11C, either separator 2 is shaped in a step-less form to be planar, and the other separator 3 is configured with a circular convex step part 33 of the double height and an annular step part 34 of the double height; as illustrated in FIG. 11D, either separator 2 is configured simply with a circular convex step part 23 of the double height (without annular step part), and the other separator 3 is configured simply with an annular step part 34 of the double height (without circular convex step part); or as illustrated in FIG. 11E, either separator 2 is configured with a circular convex step part 23 of the typical height and an annular step part 24 of a smaller height than the typical height, and the other separator 3 is configured with a circular convex step part 33 of the typical height and an annular step part 34 of a greater height than the typical height, so that the annular step parts 24 and 34 are different in height from each other.

The example of embodiment described is configured for a solid-electrolyte fuel cell 1 with a pair of mutually separate flow channel members 5 accommodated or fitted in circular convex step parts 23 and 33 in the central portions of separators 2 and 3, respectively. The mode of embodiment, not limited to this case, may be modified, as illustrated in FIG. 12A or 12B, for an integrated or monolithic flow channel member 5b formed with gas introducing channels 51 and gas discharging channels 52, to be fitted or joined for fixation to the circular convex step part 23 of either (upper, in the figure) separator 2.

The example of embodiment is configured for a solid-electrolyte fuel cell 1 with a pair of separators 2 and 3 in opposite positions to be joined together at the outer peripheral edge portions. The mode of embodiment, not limited to this case, may be modified with a pair of metallic separators 2 and 3 to be joined partially, i.e., at an adequate number of parts (e.g. convex parts defining gaps) of their outer peripheral edge portions, for adaptation to such a stack structure that discharges gas from gaps formed in an outer peripheral edge portion.

According to the embodiment, in a solid-electrolyte fuel cell, a (integrated or dedicated) flow channel member (for introducing and/or discharging gas) is fitted or joined for fixation, within a space (defined by two separators), to at least one of the separators, needing no concerns for gas leakage, requiring no checks for a complete sealing at the joint. The flow channel member and the separator may have an incomplete sealing in between, resulting in a simple mixing between gases introduced into the space and gases to be discharged therefrom, with little possibility of causing a malfunction.

According to the embodiment, with the configuration described, it is allowed to have an expanded freedom in choice of the joining method or process, permitting an enhanced yield of the process. In addition, concerns for external leakage of leaked gas can be nearly disregarded, as a remarkable effect.

This application claims the priority of Japanese Patent Application No. 2005-247561, filed on Aug. 29, 2005, claiming the priority of Japanese Patent Application, filed on Oct. 22, 2004, and their whole contents are incorporated herein by reference.

While a best mode of embodiment of the present invention and examples thereof have been described using specific terms, such description is for illustrative purposes, and it is to be understood that changes and variations may be made without departing from the spirit or scope of the following claims.

INDUSTRIAL APPLICABILITY

The present invention provides a solid-electrolyte fuel cell and a stack structure, allowing for an expanded freedom in joining method or process, permitting an enhanced yield of the process, and additionally enabling concerns for gas leakage to be nearly disregarded.

The invention claimed is:

1. A solid-electrolyte fuel cell comprising:
    a simplex cell;
    a metallic first separator of a circular sheet form having a gas introducing port and a gas discharging port which is disposed outside the gas introducing port with respect to a central portion of the metallic first separator, and a cell mounting part to which the simplex cell is fixed;
    a metallic second separator of a circular sheet form having a gas introducing port and a gas discharging port which is disposed outside the gas introducing port with respect to a central portion of the metallic second separator; and
    a flow channel member accommodated in a space between the first and second separators, and configured for communication with the gas introducing ports and the gas discharging ports to effect gas supply and gas discharge to and from said space, the flow channel member being joined, within said space, to at least one of the first and second separators,
    wherein at least one separator of the first and second separators has a first step part concentric with an outer peripheral edge portion of the at least one separator, said first step part being provided in said central portion of said at least one separator so as to form a circular protruded step part that is protruded outward,
    wherein said at least one separator has a second step part in the outer peripheral edge portion so as to form an annular protruded step part outside said circular protruded step part, wherein the first and second separators are mutually opposed, and mutually joined at outer peripheral edge portions of the first and second separators, wherein the cell mounting part is provided in an annular region between the central portion and the outer peripheral edge portion of the first separator, and has mounted thereto one or more simplex cells, wherein the cell mounting part is provided on only the first separator, wherein said flow channel member is formed with a gas introducing channel that communicates said as introducing port of said first separator with said gas introducing port of said second separator, and a gas discharging channel that communicates said gas discharging sort of said first separator with said gas discharging port of said second separator, wherein said flow channel member is accommodated within said circular protruded step part so as to be completely covered by central portions of said first and second separator, and wherein said flow channel member is formed with a gas introducing connecting passage that connects said gas introducing channel with said space, and a gas discharging connecting passage that connects said gas discharging channel with said space.

2. The solid-electrolyte fuel cell as claimed in claim 1, wherein the flow channel member comprises two or more divided parts in contact and integrated, to be complete with loads imposed on the first and second separators in mutually approaching directions of the first and second separators.

3. The solid-electrolyte fuel cell as claimed in claim 1, wherein said at least one separator is made of an alloy containing Fe or Ni as a main component, and pressed to be formed with a step part.

4. The solid-electrolyte fuel cell as claimed in claim 1, wherein one of the first and second separators has a thickness within a range of 0.05 mm to 0.5 mm.

5. The solid-electrolyte fuel cell as claimed in claim 1, wherein the outer peripheral edge portions of the first and second separators are mutually joined by one of a diffusion bonding, a welding, a brazing, and an adhesive.

6. The solid-electrolyte fuel cell as claimed in claim 1, wherein the circular sheet form of the second separator is identical to the circular sheet form of the first separator except that the first separator has the cell mounting part.

7. A solid-electrolyte fuel cell comprising:
a simplex cell;
a metallic first separator of a circular sheet form having a gas introducing port and a gas discharging port which is disposed outside the gas introducing port with respect to a central portion of the metallic first separator, and a cell mounting part to which the simplex cell is fixed;
a metallic second separator of a circular sheet form having a gas introducing port and a gas discharging port which is disposed outside the gas introducing port with respect to a central portion of the metallic second separator; and
a flow channel means accommodated in a space between the first and second separators, for communicating with the gas introducing ports and the gas discharging ports to effect gas supply and gas discharge to and from said space, the flow channel means being joined, within said space, to at least one of the first and second separators,
wherein at least one separator of the first and second separators has a first step part concentric with an outer peripheral edge portion of the at least one separator, said first step part being, provided in said central portion of said at least one separator so as to form a circular protruded step part that is protruded outward,
wherein said at least one separator has a second step part in the outer peripheral edge portion so as to form an annular protruded step part outside said circular protruded step part,
wherein the first and second separators are mutually opposed, and mutually joined at outer peripheral edge portions of the first and second separators,
wherein the cell mounting part is provided in an annular region between the central portion and the outer peripheral edge portion of the first separator, and has mounted thereto one or more simplex cells,
wherein the cell mounting part is provided on only the first separator,
wherein said flow channel means is formed with a gas introducing channel that communicates said gas introducing port of said first separator with said gas introducing port of said second separator, and a gas discharging channel that communicates said gas discharging port of said first separator with said gas discharging port of said second separator,
wherein said flow channel means is accommodated within said circular protruded step part so as to be completely covered by central portions of said first and second separator, and
wherein said flow channel means is formed with a gas introducing connecting passage that connects said gas introducing channel with said space, and a as discharging connecting passage that connects said gas discharging channel with said space.

8. The solid-electrolyte fuel cell as claimed in claim 1, wherein the flow channel member is joined to one of the first and second separators by one of a diffusion bonding, a welding, a brazing and an adhesive.

9. A stack structure comprising:
a lamination of solid-electrolyte fuel cells each including:
a simplex cell;
a metallic first separator of a circular sheet form having a gas introducing port and a gas discharging port which is disposed outside the gas introducing port with respect to a central portion of the metallic first separator, and a cell mounting part to which the simplex cell is fixed;
a metallic second separator of a circular sheet form having a gas introducing port and a gas discharging port which is disposed outside the gas introducing port with respect to a central portion of the metallic second separator; and
a flow channel member accommodated in a space between the first and second separators, and configured for communication with the gas introducing ports and the gas discharging ports to effect gas supply and gas discharge to and from said space, the flow channel member being joined, within said space, to at least one of the first and second separators,
wherein at least one separator of the first and second separators has a first step part concentric with an outer peripheral edge portion of the at least one separator, said first step part being provided in said central portion of said at least one separator so as to form a circular protruded step part that is protruded outward,
wherein said at least one separator has a second step part in the outer peripheral edge portion so as to form an annular protruded step part outside said circular protruded step part, wherein the first and second separators are mutually opposed, and mutually joined at outer peripheral edge portions of the first and second separators, wherein the cell mounting part is provided in an annular region between the central portion and the outer peripheral edge portion of the first separator, and has mounted thereto one or more simplex cells, wherein the cell mounting part is provided on only the first separator, wherein said flow channel member is formed with a gas introducing channel that communicates said gas introducing port of said first separator with said gas introducing port of said second separator, and a gas discharging channel that communicates said gas discharging port of said first separator with said gas discharging port of said second separator, wherein said flow channel member is accommodated within said circular protruded step part so as to be completely covered by central portions of said first and second separator, and wherein said flow channel member is formed with a gas introducing connecting passage that connects said as introducing channel with said space, and a as discharging connecting passage that connects said gas discharging channel with said space.

10. The stack structure as claimed in claim 9, wherein the lamination of solid-electrolyte fuel cells includes a first solid-electrolyte fuel cell having a first separator provided with a step part in a central portion thereof, and a second solid-electrolyte fuel cell neighboring the first solid-electrolyte fuel cell and having a second separator provided with a step part in a central portion thereof, and the first and second solid-electrolyte fuel cells are fixed to each other at the step parts joined together.

11. The stack structure as claimed in claim 9, wherein the lamination of solid-electrolyte fuel cells comprises a lamination of solid-oxide fuel cells.

* * * * *